United States Patent [19]

Julis et al.

[11] Patent Number: 4,865,907

[45] Date of Patent: Sep. 12, 1989

[54] RIGID FIRE BLOCK SHEET AND METHOD

[75] Inventors: Jeffrey E. Julis, Buffalo Grove; Malinda S. Mercado, Desplaines, both of Ill.

[73] Assignee: Bisco Products Inc., Elk Grove Village, Ill.

[21] Appl. No.: 255,363

[22] Filed: Oct. 7, 1988

Related U.S. Application Data

[63] Continuation-in-part of Ser. No. 103,064, Sep. 30, 1987, Pat. No. 4,822,659.

[51] Int. Cl.$^4$ ................................................ B32B 3/26
[52] U.S. Cl. ..................................... 428/241; 156/79; 156/329; 428/242; 428/246; 428/266; 428/268; 428/273; 428/319.3; 428/447; 428/920; 428/921
[58] Field of Search ............... 428/241, 242, 246, 266, 428/268, 273, 319.3, 447, 920, 921; 156/79, 329; 521/82

[56] References Cited

U.S. PATENT DOCUMENTS

| | | | |
|---|---|---|---|
| 2,703,775 | 3/1955 | Panagrossi et al. | 428/268 |
| 4,189,545 | 2/1980 | Modic | 521/145 |
| 4,418,157 | 11/1983 | Modic | 521/82 |
| 4,760,098 | 7/1988 | Miutel | 521/82 |
| 4,806,185 | 2/1989 | Porter et al. | 428/268 |

OTHER PUBLICATIONS

Reichhold Chemicals, Inc.-Material Data Sheet (11/04/87) for Product Code 37-624.
Reichhold Chemicals, Inc.-Material Data Sheet (6/84) for EPOTUF® 37-200.
Reichhold Resin & Binders Division-Product Bulletin (6/84) for EPOTUF® Epoxy Resin 37-200.
Reichhold Chemical Coatings Division-Product Bulletin (undated) for EPOTUF® Epoxy Resin Hardener 37-624.

*Primary Examiner*—William J. Van Balen
*Attorney, Agent, or Firm*—Dressler, Goldsmith, Shore, Sutker & Milnamow, Ltd.

[57] ABSTRACT

A fire block sheet is provided comprising a laminate of (a) at least one rigid support layer comprising a cured glas fiber sheet impregnated with fire retardant epoxy resin and (b) an elastomeric cured silicone foam rubber layer containing alumina trihydrate secured to said support layer, said fire block sheet being capable, in a thickness of 1/16 inches, of withstanding flame penetration and preventing backside ignition when exposed at one side to a flame at a temperature of 1000° C. for a period of at least 15 minutes. In a preferred embodiment, the elastomeric cured silicone rubber layer is sandwiched between two rigid support layers.

22 Claims, No Drawings

RIGID FIRE BLOCK SHEET AND METHOD

REFERENCE TO EARLIER APPLICATION

This application is a continuation in part of co-assigned application Ser. No. 103,064, filed Sept. 30, 1987 by James S. Anderson, Kenneth S. Hoffman, Jeffrey E. Julis and Malinda Mercado now U.S. Pat. 4,822,659.

BACKGROUND OF THE INVENTION

Fire damage to life and property is a problem wherever it occurs, but it is a particularly acute problem in transportation vehicles on land, on and under the seas, and in the air, where fireproofing materials are necessarily limited to minimal weights and volumes.

A recent development in fire retardance, disclosed in said application Serial No. 103,064, comprises a flexible laminate of a support layer and an attached cured silicone foam rubber layer containing alumina trihydrate, which laminate has a surface flammability flame spread index of zero at 20 minutes of exposure in accordance with ASTM E-162 and is capable, in a thickness of 1/16 inch, of blocking a flame of 1050° C. for more than one hour.

This flexible laminate can be adhered, or otherwise attached, to any fire susceptible surface and can thereby retard the spread of a fire until steps can be taken to bring the fire under control.

In many places, however, it may be desirable to retard the spread of a fire where there is no underlying surface to which to attach the aforesaid flexible laminate. There is therefore need for a light weight and small volume fireblock sheet which is rigid and self-supporting.

SUMMARY OF THE INVENTION

In accordance with one aspect of the present invention, there is provided a fire block sheet comprising a laminate of (a) at least one rigid support layer comprising a cured glass fiber sheet impregnated with an epoxy resin and (b) an elastomeric cured silicone foam rubber layer containing alumina trihydrate secured to said support layer, said fire block sheet being capable, in a thickness of about 1/16 inch, of withstanding flame penetration and preventing backside ignition when exposed at one side to a flame at a temperature of 1000° C. for a period of at least 15 minutes.

In accordance with another aspect of the present invention, there is provided a method of producing the fire block sheet comprising juxtaposing a silicone layer of the group consisting of elastomeric cured silicone foam containing alumina trihydrate and foamable compositions therefor and at least one layer of glass fiber sheet of the group consisting of cured and uncured glass fiber sheets impregnated with fire retardant epoxy resin components to form a composite of said layers, at least one of said layers being uncured and thereafter curing said composite at an elevated temperature.

In the preferred embodiment of the invention, the elastomeric cured silicone foam rubber layer is sandwiched between two rigid support layers.

The cured silicone foam rubber layer comprises the reaction product of a vinyl-terminated polysiloxane containing $-Si(CH_3)_2O-$ units and an organohydrogen siloxane polymer containing $-Si(H)(CH_3)O-$ units. The silicone rubber foam also contains alumina trihydrate.

The silicone rubber foam is a modification of the foam sold commercially by General Electric Company as RTF 762 Silicone Rubber Foam. The latter is described in Modic U.S. Pat. No. 4,418,157; granted Nov. 29, 1983; and further details are described in Modic U.S. Pat. No. 4,189,545, granted Feb. 19, 1980. The commercially available silicone rubber foam is made of two ingredients, labelled "A" and "B", as hereinafter described. The silicone rubber foam utilized in this invention contains, as an additional ingredient, from about 30 to about 55 weight percent of alumina trihydrate.

Part A of the silicone rubber formulation contains a polymer having the formula:

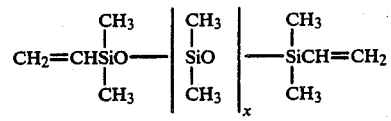

Part A also contains a finely divided crystalline silica in an amount from about 10 to about 100 parts by weight based on 100 parts of vinyl-containing polysiloxane and preferably 20 to 25 parts by weight thereof.

In addition, as disclosed in U.S. Pat. No. 4,189,545, Part A contains from 1 to 250 parts per million of a platinum catalyst, preferably a complex of platinum and a vinyl-containing polysiloxane.

Part B of the silicone rubber formulation contains a polymer having the formula:

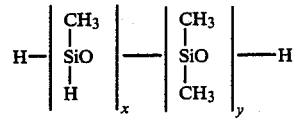

In accordance with this invention, alumina trihydrate is added to the silicone rubber, generally to Part A thereof before the blending thereof with Part B. The preferred blending ratios for Parts A and B is from about 10 to about 16 parts by weight of Part B per 100 parts of Part A. The preferred blending ratio between Part A and the alumina trihydrate is from about 50 to 125 parts of alumina trihydrate per 100 Part A.

When silicone foams are prepared at varying ratios (in parts by weight) of Parts A and B and the alumina trihydrate, the following results are obtained:

| Part A | 100 | 100 | 100 | 100 | 100 | 100 | |
|---|---|---|---|---|---|---|---|
| Alumina trihydrate | 0 | 50 | 75 | 100 | 125 | 150 | or greater |
| Part B | 7 | 11 | 12.5 | 14 | 16 | 18 | or greater |
| Pass/Fail flame tests | Fail | Pass | Pass | Pass | Pass | Cannot be mixed | |

The alumina trihydrate generally contains about 65 weight percent of $Al_2O_3$ and about 35 ignition. Good results have been obtained with alumina trihydrate materials which have the following properties:

| | |
|---|---|
| $Al_2O_3$, % | 64.4–65.4 |
| $SiO_2$, % | less than 0.02 |
| $Fe_2O_3$, % | 0.004–0.007 |
| $Na_2O$ total, % | 0.015–0.30 |

| -continued | |
|---|---|
| Na₂O soluble, % | 0.004–0.12 |
| Free moisture, 110° C., % | 0.05–0.12 |
| Loose bulk density, gm/cu cm | 0.35–1.2 |
| Packed bulk density, gm/cu cm | 0.5–1.5 |
| Surface area, sq m/gm | 0.10–14 |
| Color reflectance | 75 to 96 | wherein the surface area is measured by Perkins-Elmer Shell Sorptometer, and wherein the light reflectance is measured with a photo-volt reflectometer Model 670.

Shell Sorptometer, and wherein the light reflectance is measured with a photo-volt reflectometer Model 670.

While it is not desired to be bound by any theory of operation, it is believed that the alumina trihydrate component functions initially by absorbing heat, first from the decomposition of the hydrate to liberate water and by vaporization of the water. Thereafter, after removal of the water, it is believed that the alumina combines with the silicone to produce aluminosilicate ceramics having substantial heat resistance.

After exposure to flame temperatures, the normally flexible and resilient silicone foam rubber becomes brittle and crumbly and would fall apart if the silicone rubber layer were not adhered to the rigid support layer, or preferably sandwiched between two rigid support layers.

Epoxy resins, as is well known, are fundamentally reaction products of a compound with an epoxide group, such as epichlorohydrin, and a polyhydroxy compound, such as bisphenol A. In practice, the epoxide group compound and the polyhydroxy compound are pre-reacted to produce an epoxide-terminated prepolymer; and the prepolymer is then reacted with a cross linking agent, or hardener, such as amines, amides, sulfides, urea- and phenolformaldehyde prepolymers, acids, acid anhydrides and the like.

For fire retardancy, the epoxy resin is one that has a substantial content of halogen of the group consisting of chlorine and bromine, preferably a halogen content of at least about 20 weight percent. One useful epoxy resin utilizes tetrabromobisphenol A as its polyhydroxy component.

The components of the epoxy resin composition may be premixed well in advance of use for compositions which require elevated temperatures for cure, or they may be maintained separately until just before the impregnation step in compositions which can cure at room temperature. In either case, high temperature curing is desirable to produce fully cured, rigid products. Final curing temperatures from about 120° C. to about 200° C. are suitable; and temperatures from about 150° C. about 190° C. are preferred.

In some cases, pre-impregnated glass fiber sheets obtained from a supplier thereof, may be used for convenience and for uniformity.

The amount of epoxy resin impregnant in the glass fiber sheet must be sufficient to provide the desired rigidity after curing but not so high as to impair the fire block properties of the final product. Typically, the impregnated glass fiber sheet, before curing, contains from about 40 to about 70 weight percent of epoxy resin components; and the final impregnated glass fiber sheet, after curing, contains from about 30 to about 50 weight percent of epoxy resin.

In the fire block sheet of this invention, the silicone foam rubber layer is suitably from about 0.040 to about 0.150 inches in thickness and preferably from about 0.060 to about 0.100 inches. The density of the silicone foam rubber layer is suitable from about 20 to about 40 pounds per cubic foot and preferably from about 27 to about 37 pounds per cubic foot.

The impregnated glass fiber sheet (or each of them when there are two) is suitably from about 0.007 to about 0.020 inches in thickness, and preferably from about 0.011 to about 0.015 inches.

To prepare the rigid fire block sheet of the invention in its sandwich form, two pre-impregnated glass fiber sheets of desired thickness are aligned with each other on the top and bottom carriers of a hinged assembly. The space between the two carriers is adjusted to the desired thickness of the silicone foam layer and an amount of silicone foam rubber formulation calculated to provide the desired density of final foam is introduced between the two layers. The composite is then cured at an elevated temperature, preferably between about 40° C. and 60° C. for a period between about 10 and about 30 minutes. The carriers are then removed and the top and bottom surfaces of the composite are lined with release sheets before the entire composite is press cured within a closed mold at a temperature between about 150° and about 190° C. for a period between about 1 and about 3 hours. In some cases, it may be desirable to follow the press cure with a post-cure (out of the mold) at a temperature from about 150° C. to about 200° C. for a period of from about 15 minutes to about one hour.

The closed mold may be a flat mold if a flat sheet is desired. Or, it may be a mold having a non-planar configuration.

In an alternative method of preparation, a cured silicone foam, rather than an uncured formulation therefor, may be inserted between two impregnated glass fiber sheets and thereafter can be cured, press cured, and sometimes after cured, as described above.

In still another alternative method, the impregnated glass sheets may be precured to rigidity before the silicone foam rubber formulation is juxtaposed to them; and the composite is thereafter heated to cure the silicone foam.

EXAMPLE 1

Two commercially available pre-impregnated glass fiber sheets are used as the outer layers of a composite structure to be made into the rigid fire block sheet of this invention. The sheets are 8 Harness satin weave and made of high temperature, high strength S-2 glass fibers. Each glass sheet has a thickness of 0.0090 inches and a density of 8.90 ounces per square yard. The glass sheets are impregnated with a hot melt sulfur-catalyzed epoxy system in an amount of about 40 weight percent to about 60 weight percent of glass sheet.

The center layer is a precured silicone foam which is a soft, flexible partially closed cell foam having a density between about 27 to about 37 pounds per cubic foot. Its thickness is between about 1/16 and about ⅛ inches. It is made by mixing an A portion of a silicone formulation [comprising a vinyl-terminated polysiloxane containing $-Si(CH_3)_2O-$ units] with about an equal weight portion of finely divided alumina trihydrate and thereafter mixing in about 14 parts by weight of B portion of the silicone formulation per 100 parts of original A portion. The B portion is an organohydrogen siloxane polymer containing $-Si(H)(CH_3)O-$ units. The components are vigorously mixed for 30 to 45 seconds until uniformity is obtained and then cured between spaced sheets, first at room temperature for about 15-20 minutes and then in a 40° C. oven for about 5 minutes.

The above described foam layer is placed between the above described two impregnated glass sheets and press cured within a mold at a temperature of about 180° C. for a period of about 2 hours.

The cured composite is rigid and may be exposed to a temperature of 1100° C. for a period of at least 15 minutes, while withstanding flame penetration and not exhibiting backside ignition.

EXAMPLE 2

Example 1 is repeated except that the glass fiber sheets are impregnated shortly before assembly of the composite with an epoxy resin formulation impregnant in which the epoxy group component is a diglycidyl ether of tetrabromobisphenol A, as illustrated by EPO-TUF 37-200 commercially available from Reichhold Chemicals, Inc., White Plains, N.Y., cross-linked with a hardener such as methyl tetrahydrophthalic anhydride as illustrated by EPOTUF Epoxy Resin Hardener 37-624 commercially available from Reichhold Chemicals, Inc., White Plains, N.Y. The epoxy resin formulation impregnant is used in an amount of 45 parts by weight to 55 parts of glass fiber sheet. In the formulation, the epoxy group component is used in an amount of 100 parts by weight to 64 parts of hardener. The desired amounts of the epoxy group component and hardener are admixed at about room temperature, i.e., 15° to 30° C., in a suitable vessel. Admixing continued for a time period sufficient to obtain a homogeneous mixture. Heat is then applied to decrease the viscosity of the admixture to enhance application to the glass fiber sheets. This temperature is about 45° C. The admixture is then applied to the glass fiber sheet by brushing to impregnate the sheet.

The precured silicone foam sheet, as described in Example 1, is primed on both sides by brushing with a solution containing up to 5 weight percent of ethyl orthosilicate in a solvent comprising hexane (in excess of 80 weight percent) and toluene (up to 10 weight percent). This primer improves adhesion of the impregnated glass fiber sheet to the silicone foam sheet. Volatiles are then evaporated off leaving the ethyl orthosilicate.

The resulting silicone foam sheet is sandwiched between two impregnated glass fiber sheets and placed in mold to cure. About 15 psi of pressure is then applied to the sandwich. This pressure is maintained for a time period of about 3 hours. The temperature that is maintained for this time period is about 180° C.

At the end of this time the finished composite is removed from the mold.

The finished composite is rigid and can be exposed to a temperature of 1000° C. for a period of at least 20 minutes, while withstanding flame penetration and not exhibiting backside ignition Although the present invention has been described with reference to preferred embodiments, those skilled in the art will recognize that changes may be made in form and detail without departing from the teachings and scope of the invention.

I claim:

1. A fire block sheet comprising a laminate of (a) at least one rigid support layer comprising a cured glass fiber sheet impregnated with fire retardant epoxy resin and (b) an elastomeric cured silicone foam rubber layer containing alumina trihydrate secured to said support layer, said fire block sheet being capable, in a thickness of 1/16 inches, of withstanding flame penetration and preventing backside ignition when exposed at one side to a flame at a temperature of 1000° C. for a period of at least 15 minutes.

2. The fire block sheet of claim 1 wherein said elastomeric cured silicone foam rubber layer is sandwiched between two rigid support layers comprising cured epoxy-resin impregnated fiberglass sheets.

3. The fire block sheet of claim 1 wherein said fiberglass sheet is a woven fabric.

4. The fire block sheet of claim 1 wherein said silicone foam rubber layer comprises the reaction product of a vinyl-terminated polysiloxane containing $-Si(CH_3)_2O-$ units and an organo-hydrogen siloxane polymer containing $-Si(H)(CH_3)O-$ units.

5. The fire block sheet of claim 4 wherein said reaction product is made from about 10 to 16 parts by weight of said organohydrogensiloxane for each 100 parts of said vinyl-terminated polysiloxane.

6. The fire block sheet of claim 4 wherein said reaction product contains from about 50 to about 125 parts by weight of alumina trihydrate per 100 parts of said vinyl-terminated polysiloxane.

7. The fire block sheet of claim 6 wherein said reaction product contains finely divided silica.

8. The fire block sheet of claim 6 wherein said reaction product contains from 1 to 250 parts of a platinum catalyst per million parts of said vinyl-terminated polysiloxane.

9. The fire block sheet of claim 1 wherein said alumina trihydrate has the following properties:

| | |
|---|---|
| $Al_2O_3$, % | 64.4–65.4 |
| $SiO_2$, % | less than 0.02 |
| $Fe_2O_3$, % | 0.004–0.007 |
| $Na_2O$ total, % | 0.015–0.30 |
| $Na_2O$ soluble, % | 0.004–0.12 |
| Free moisture, 110° C., % | 0.05–0.12 |
| Loose bulk density, gm/cu cm | 0.35–1.2 |
| Packed bulk density, gm/cu cm | 0.5–1.5 |
| Surface area, sq m/gm | 0.10–14 |
| Color reflectance | 75 to 96 | wherein the surface area is measured by Perkins-Elmer Shell Sorptometer, and wherein the light reflectance is measured with a photo-volt reflectometer Model 670.

10. The fire block sheet of claim 1 wherein said cured silicone foam rubber layer is a partially closed cell foam.

11. The fire block sheet of claim 1 wherein said cured silicone foam rubber layer has a density ranging between about 20 and about 40 pounds per cubic foot.

12. The fire block sheet of claim 7 wherein said silicone foam rubber layer contains from about to 100 parts of crystalline silica per 100 parts of said vinyl-terminated polysiloxane.

13. The fire block sheet of claim 1 wherein said fire retardant epoxy resin is a halogenated epoxy resin with a content of at least about 20 weight percent of a halogen of the group consisting of chlorine and bromine.

14. The fire block sheet of claim 1 wherein said cured glass fiber sheet contains from about 30 to about 50 weight percent of cured fire retardant epoxy resin.

15. The fire block sheet of claim 2 wherein each of said rigid support layers is from about 0.007 to about 0.020 inches thick and said elastomeric cured silicone foam layer is from about 0.040 to about 0.150 inches thick.

16. A method of producing a rigid fire block sheet comprising juxtaposing a silicone layer of the group consisting of elastomeric cured silicone foam containing alumina trihydrate and foamable compositions therefor and at least one layer of glass fiber sheet of the group consisting of cured and uncured glass fiber sheets impregnated with fire retardant epoxy resin components to form a composite of said layers, at least one of said layers being uncured and thereafter curing said composite at an elevated temperature.

17. The method of claim 16 wherein said silicone foam layer is sandwiched between two layers of said impregnated glass fiber sheets.

18. The method of claim 16 wherein said silicone layer is an elastomeric cured silicone foam and said glass fiber sheet is uncured.

19. The method of claim 16 wherein said silicone layer is a foamable composition and said glass fiber sheet is uncured.

20. The method of claim 16 wherein said silicone layer is a foamable composition and said glass fiber sheet is cured.

21. The method of claim 16 wherein said epoxy resin contains at least about 20 weight percent of a halogen of the group consisting of chlorine and bromine.

22. The method of claim 21 wherein tetrabromobisphenol A is a component of said epoxy resin.

* * * * *

UNITED STATES PATENT AND TRADEMARK OFFICE
CERTIFICATE OF CORRECTION

PATENT NO. : 4,865,907

DATED : September 12, 1989

INVENTOR(S) : Jeffrey E. Julis and Malinda S. Mercado

It is certified that error appears in the above-identified patent and that said Letters Patent is hereby corrected as shown below:

Column 2, line 61, before "ignition", insert --weight percent of bound water which is lost on--.

Column 3, delete lines 10 and 11.

Column 6, line 54 (second line of claim 12) after "about", insert --10--.

Signed and Sealed this

Tenth Day of September, 1991

Attest:

HARRY F. MANBECK, JR.

Attesting Officer

Commissioner of Patents and Trademarks